United States Patent
Wei et al.

(10) Patent No.: US 8,971,852 B2
(45) Date of Patent: Mar. 3, 2015

(54) METHOD AND DEVICE FOR DUAL-NETWORK TERMINAL COMMUNICATION

(75) Inventors: Yide Wei, Shenzhen (CN); Rennai Xie, Shenzhen (CN); Qi Yang, Shenzhen (CN); Zhuan Yin, Shenzhen (CN)

(73) Assignee: ZTE Corporation, Hi-Tech Industrial Park, Nanshan District Shenzhen, Guangdong Province (CN)

( * ) Notice: Subject to any disclaimer, the term of this patent is extended or adjusted under 35 U.S.C. 154(b) by 0 days.

(21) Appl. No.: 13/634,589

(22) PCT Filed: Jan. 19, 2011

(86) PCT No.: PCT/CN2011/070397
§ 371 (c)(1),
(2), (4) Date: Sep. 13, 2012

(87) PCT Pub. No.: WO2012/051807
PCT Pub. Date: Apr. 26, 2012

(65) Prior Publication Data
US 2013/0203385 A1 Aug. 8, 2013

(30) Foreign Application Priority Data

Oct. 20, 2010 (CN) .......................... 2010 1 0522937

(51) Int. Cl.
*H04W 88/06* (2009.01)
*H04W 8/18* (2009.01)
*H04W 48/18* (2009.01)

(52) U.S. Cl.
CPC .............. *H04W 88/06* (2013.01); *H04W 8/183* (2013.01); *H04W 48/18* (2013.01)
USPC ........................................ 455/411; 455/552.1

(58) Field of Classification Search
USPC .............................. 455/411, 436, 552.1, 553.1
See application file for complete search history.

(56) References Cited

U.S. PATENT DOCUMENTS

| 2004/0266435 A1* | 12/2004 | de Jong et al. ................ 455/436 |
| 2009/0163240 A1* | 6/2009 | Ryu et al. .................... 455/553.1 |
| 2010/0304782 A1* | 12/2010 | Chang et al. ............... 455/552.1 |

FOREIGN PATENT DOCUMENTS

| CN | 1705400 A | 12/2005 |
| CN | 1708153 A | 12/2005 |
| CN | 1753553 A | 3/2006 |
| CN | 101052188 A | 10/2007 |

OTHER PUBLICATIONS

International Search Report for PCT/CN2011/070397 dated Jul. 28, 2011.

* cited by examiner

*Primary Examiner* — Myron K Wyche
(74) *Attorney, Agent, or Firm* — Husch Blackwell LLP

(57) ABSTRACT

An apparatus for performing communication by a dual network terminal is disclosed. The dual network terminal is a dual network and dual standby terminal, and the apparatus includes a 3G wireless communication subsystem, a 2G wireless communication subsystem and an identity identification module. The 2G wireless communication subsystem is connected with the identity identification module and the 3G wireless communication subsystem respectively, the 3G wireless communication subsystem is connected with the 2G wireless communication subsystem, and the 3G wireless communication subsystem and the 2G wireless communication subsystem include one virtual identity identification card administration module respectively. A method for performing communication by a dual network terminal is further disclosed, including: the 2G wireless communication subsystem reading information in the identity identification card in the identity identification module, storing the information in its own first virtual identity identification card administration module, and communicating with the 2G network by using the information.

15 Claims, 3 Drawing Sheets

METHOD AND DEVICE FOR DUAL-NETWORK TERMINAL COMMUNICATION

TECHNICAL FIELD

The present invention relates to the mobile communication field, and in particular, to a method and apparatus for performing communication by a dual network terminal.

BACKGROUND OF THE RELATED ART

With the construction of the 3rd generation mobile communication (3G) of China is developed progressively, all three major mobile communication operators step into the 3G era formally. However, since in the initial stage of the construction of the current 3G network and the following development period, the cover level of the 3G network, compared with the 2nd Generation mobile communication (2G) network which is already optimized and improved constantly in more than ten years, no matter the cover breadth (the 2G network nearly covers all natural villages of our country) or the cover depth (such as, indoor, basement and subway, etc.) is greatly fallen behind, therefore, each major operator regards, invariably, the long-term dual network co-existence of the 2G and the 3G as its own operation target and strategy. China Mobile has proposed correspondingly the three "No" principle "No card changing, No number changing, No requirement of registration" and the singularly-colored Time Division-Synchronization Code Division Multiple Access (TD-SCDMA)/Global system for Mobile Communications (GSM) dual mode and single standby customized cell phone terminal to popularize and run its own TD-SCDMA 3G network.

But this kind of strategy, "co-existence of the 2G and 3G network" and "TD-SCDMA/GSM dual mode and single standby customized terminal", meets difficult problem in the real operation. On one hand, due to the existing strategy of "2G and 3G dual mode handover", the reselection of the cell phone terminal is frequent, the power consumption is serious, the conversation is dropped, the network stream is cutoff, and even the abnormal faults take place occasionally such as the network disconnecting, etc. so that the user experiences is worse; on the other hand, due to the cover quality of the existing 3G network is still not so good as the GSM network, customers have little confidence in the TD-SCDMA network. The problem of the network has caused the predicament of the terminal, and the predicament of the terminal has enlarged the problem of the network conversely.

CONTENT OF THE INVENTION

The technical problem to be solved by the present invention is to provide a method and apparatus for performing communication by a dual network terminal, to realize that the dual network terminal communicates with the 2G/3G network by using one Subscriber Identity Module (SIM) card.

In order to solve the above-mentioned problem, the present invention provides a method for performing communication by a dual network terminal, the dual network terminal being a dual network and dual standby terminal, and the dual network and dual standby terminal comprising an application subsystem, a third generation mobile communication (3G) wireless communication subsystem, a second generation mobile communication (2G) wireless communication subsystem and an identity identification module, an identity identification card being inserted in the identity identification module, the identity identification card storing information for a 2G network and a 3G network to perform identity authorization, the 3G wireless communication subsystem and the 2G wireless communication subsystem comprising a virtual identity identification card administration module respectively, the 2G wireless communication subsystem being connected with the application subsystem, the identity identification module and the 3G wireless communication subsystem respectively, and the 3G wireless communication subsystem being connected with the application subsystem and the 2G wireless communication subsystem, and the method comprising:

the 2G wireless communication subsystem reading the information in the identity identification card in the identity identification module, storing the information in the identity identification card in a first virtual identity identification card administration module of the 2G wireless communication subsystem, and communicating with the 2G network by using the information of the identity identification card in the first virtual identity identification card administration module; and the 3G wireless communication subsystem reading the information of the identity identification card in the first virtual identity identification card administration module in the 2G wireless communication subsystem into a second virtual identity identification card administration module of the 3G wireless communication subsystem, and communicating with the 3G network by using the information of the identity identification card in the second virtual identity identification card administration module.

The method further comprises:

when a user of the dual network and dual standby terminal initiates a service, the application subsystem selecting a network according to a service type; when the initiated service is a packet switching (PS) service or a videophone service in a circuit switching (CS) service, the application subsystem selecting the 3G network; when the initiated service is a CS service except the videophone service, the application subsystem selecting the 2G network; and when the selected network meets a condition of signal intensity, the wireless communication subsystem corresponding to the selected network performing communication through the selected 2G network or 3G network.

The method further comprises:

when the initiated service is a PS service and the application subsystem selects the 3G network, if judging that the PS service is unable to be initiated according to a current signal intensity of the 3G network monitored by the 3G wireless communication subsystem, the application subsystem notifying the 2G wireless communication subsystem to activate a 2G data link of the 2G network and initiating the service; and when the initiated service is a PS service, in a process of the 3G wireless communication subsystem performing communication through the 3G network, if the application subsystem judges that the current signal intensity of the 3G network is weakened to be unable to bear the PS service according to the current signal intensity of the 3G network monitored by the 3G wireless communication subsystem, then the application subsystem notifying the 3G wireless communication subsystem and the 2G wireless communication subsystem to switch a packet data protocol (PDP) data link corresponding to the PS service from a 3G data link to the 2G data link.

The method further comprises:

when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifying the 3G wireless communication subsystem and the 2G wireless communication subsystem to switch the PDP data link corresponding to the PS service from the 2G data link to the 3G data link.

Wherein, the first virtual identity identification card administration module lies in an AT command interface layer of the 2G wireless communication subsystem, and the second virtual identity identification card administration module lies in an AT command interface layer of the 3G wireless communication subsystem.

Wherein, in the step of the 2G wireless communication subsystem reading information in the identity identification card in the identity identification module and storing the information in the identity identification card into a first virtual identity identification card administration module of the 2G wireless communication subsystem, the 2G wireless communication subsystem stores one or more of three parameters, a public land mobile network (PLMN) identification, a Temporary Mobile Subscriber Identity (TMSI) and a Location Area Identification (LAI) in the identity identification card, in the first virtual identity identification card administration module.

The method further comprises:

in the process of the 3G wireless communication subsystem communicating with the 3G network, if an International Mobile Subscriber Identification Number (IMSI) of the identity identification card needs to be sent to the 3G network, then the 3G wireless communication subsystem asynchronously accessing the identity identification card in the identity identification module through the 2G wireless communication subsystem and obtaining the IMSI of the identity identification card.

Wherein, the 3G network is a Time Division-Synchronous Code Division Multiple Access (TD-SCDMA) network, a Wideband Code Division Multiple Access (WCDMA) network or a CDMA2000 network, and the 2G network is a global system for mobile communications (GSM) network or a Code Division Multiple Access (CDMA) Network.

In order to solve the above problem, the present invention also provides an apparatus for performing communication by a dual network terminal, the dual network terminal being a dual network and dual standby terminal, and the apparatus comprising a third generation mobile communication (3G) wireless communication subsystem, a second generation mobile communication (2G) wireless communication subsystem and an identity identification module, the 2G wireless communication subsystem being connected with the identity identification module and the 3G wireless communication subsystem respectively, and the 3G wireless communication subsystem being connected with the 2G wireless communication subsystem, and the 3G wireless communication subsystem and the 2G wireless communication subsystem comprising one virtual identity identification card administration module respectively, wherein, one identity identification card is inserted in the identity identification module, and the identity identification card is configured to store information for a 2G network and a 3G network to perform identity authorization;

the 2G wireless communication subsystem is configured to read information in the identity identification card in the identity identification module, store the information in the identity identification card in a first virtual identity identification card administration module of the 2G wireless communication subsystem, and communicate with the 2G network by using the information of the identity identification card in the first virtual identity identification card administration module; and the 3G wireless communication subsystem is configured to read the information of the identity identification card in the first virtual identity identification card administration module of the 2G wireless communication subsystem into a second virtual identity identification card administration module of the 3G wireless communication subsystem, and communicate with the 3G network by using the information of the identity identification card in the second virtual identity identification card administration module.

The apparatus further comprises an application subsystem, connected with the 3G wireless communication subsystem and the 2G wireless communication subsystem respectively;

the application subsystem is configured to: when a user of the dual network and dual standby terminal initiates a service, select network according to a service type; when the initiated service is a packet switching (PS) service or a videophone service in a circuit switching (CS) service, select the 3G network and notify the 3G wireless communication subsystem; when the initiated service is a CS service except the videophone service, select the 2G network and notify the 2G wireless communication subsystem;

the 3G wireless communication subsystem is further configured to: monitor a current signal intensity of the 3G network, and notify the current signal intensity of the 3G network to the application subsystem; and when the application subsystem selects the 3G network and the 3G network meets a condition of the signal intensity, communicate through the 3G network; and the 2G wireless communication subsystem is further configured to: when the application subsystem selects the 2G network and the 2G network meets the condition of the signal intensity, communicate through the 2G network.

Wherein, the application subsystem is further configured to: when the initiated service is a PS service and when judging that the PS service is unable to be initiated according to the current signal intensity of the 3G network monitored by the 3G wireless communication subsystem, notify the 2G wireless communication subsystem to activate a 2G data link of the 2G network and initiate the PS service; and when the initiated service is a PS service, in a process of performing the communication through the 3G network, if judging that the current signal intensity of the 3G network is weakened to be unable to bear the PS service according to the current signal intensity of the 3G network monitored by the 3G wireless communication subsystem, then notify the 3G wireless communication subsystem and the 2G wireless communication subsystem to switch a packet data protocol (PDP) data link corresponding to the PS service from a 3G data link to a 2G data link; and when the 2G wireless communication subsystem uses the 2G data link to perform the PS service, and when judging that the current signal intensity of the 3G network is enhanced to be able to bear the PS service according to the current signal intensity of the 3G network monitored by the 3G wireless communication subsystem, then notify the 3G wireless communication subsystem and the 2G wireless communication subsystem to switch the PDP data link corresponding to the PS service from the 2G data link to the 3G data link.

Wherein, the first virtual identity identification card administration module lies in an AT command interface layer of the 2G wireless communication subsystem, and the second virtual identity identification card administration module lies in an AT command interface layer of the 3G wireless communication subsystem.

Wherein, the 2G wireless communication subsystem is further configured to: when reading information in the identity identification card in the identity identification module and storing the information in the identity identification card into the first virtual identity identification card administration module, store one or more of three parameters, a public land mobile network (PLMN) identification, a Temporary Mobile Subscriber Identity (TMSI) and a Location Area Identification (LAI) in the identity identification card, into the first virtual identity identification card administration module.

Wherein, the 3G wireless communication subsystem is further configured to: in the process of communicating with the 3G network, if an International Mobile Subscriber Identification Number (IMSI) of the identity identification card needs to be sent to the 3G network, then asynchronously access the identity identification card in the identity identification module through the 2G wireless communication subsystem and obtain the IMSI of the identity identification card.

Wherein, the 3G network is a Time Division-Synchronous Code Division Multiple Access (TD-SCDMA) network, a Wideband Code Division Multiple Access (WCDMA) network or a CDMA2000, and the 2G network is a global system for mobile communications (GSM) network or a Code Division Multiple Access (CDMA) Network.

By adopting the method and apparatus of the present invention, it realizes the dual network and dual standby function only by using a single SIM card, compared with other terminal which is dual network and dual standby with dual card and dual number, is conducive to the design of the hardware and the structure and saves the cost. Compared with the existing 2G/3G dual mode and single standby terminal technology, the present invention, when giving consideration to both the CS domain service specialty of the 2G network and the data service specialty of the 3G network, reduces the probability of the dual mode switching (only part of switching in the data service), which fundamentally reduces and avoids the failures, such as, frequent reselection of the network, serious power consumption, the call dropping, and the network disconnecting, etc., caused by the 2G/3G dual mode and single standby terminal because of the "2G and 3G dual mode switching" policy as well. It improves the experiences of the terminal customers, and also promotes the development of the TD-SCDMA network.

PREFERRED EMBODIMENTS OF THE PRESENT INVENTION

The embodiments of the present invention will be described in detail with reference to the accompanying drawings hereinafter. It should be illustrated that, in the case of no confliction, the embodiments in the present application and features in these embodiments can be combined with each other arbitrary.

The present invention mainly aims at the situation that the dual network and dual standby terminal adopts a dual network and dual standby and single card single number of a dual modem framework.

Figure 1:
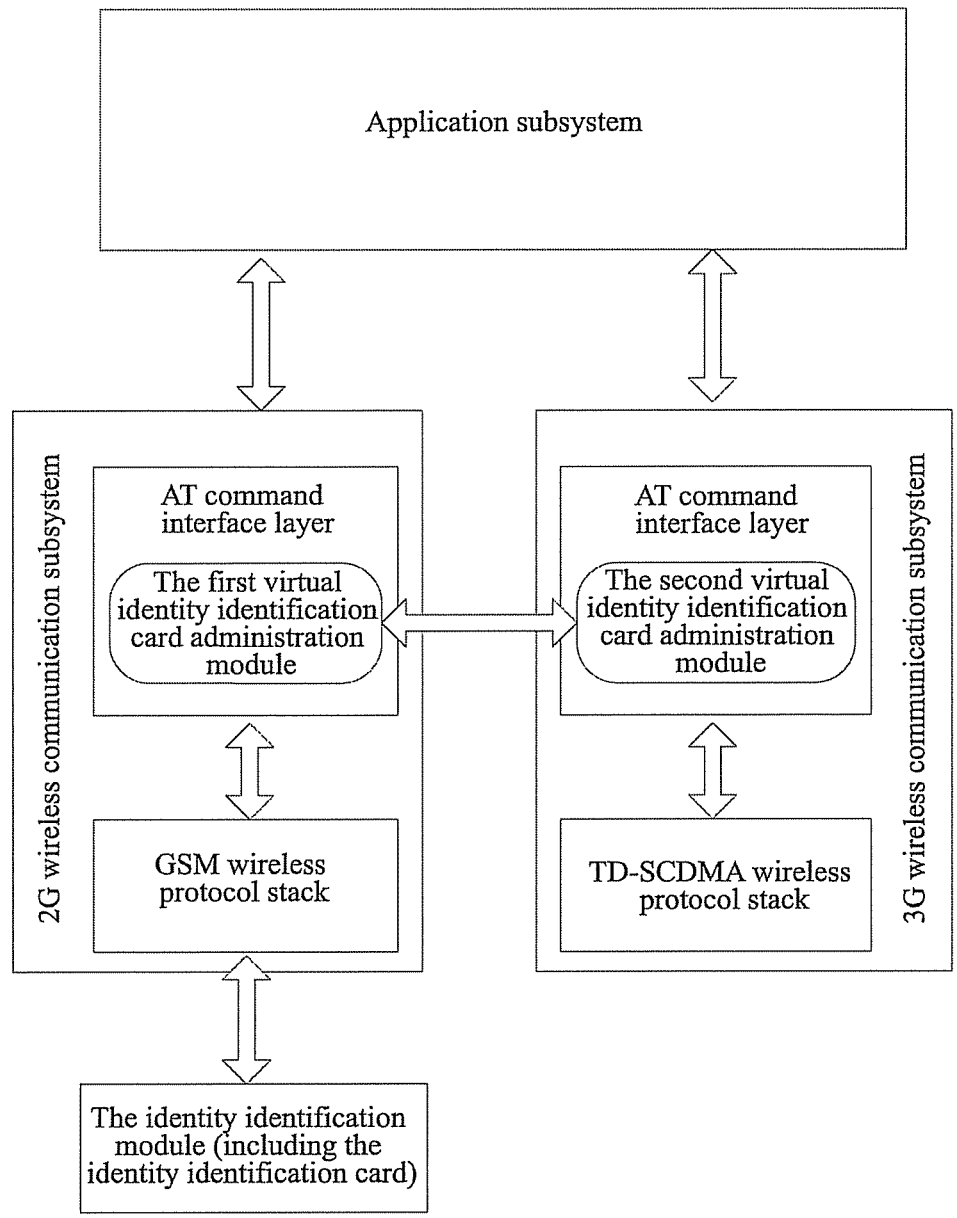
FIG. 1 is a schematic diagram of an apparatus for performing communication by a dual network and dual standby terminal according to an embodiment of the present invention.

As shown in FIG. 1, the dual network and dual standby terminal includes an application (AP) subsystem, a 3G wireless communication subsystem, a 2G wireless communication subsystem and an identity identification module (SIM card module), an identity identification card (SIM card) is inserted in the identity identification module, the identity identification card stores information for a 2G network and a 3G network to perform identity authorization, the 2G wireless communication subsystem is connected with the application subsystem, the identity identification module and the 3G wireless communication subsystem respectively, and the 3G wireless communication subsystem is connected with the application subsystem and the 2G wireless communication subsystem.

The 3G wireless communication subsystem and the 2G wireless communication subsystem compose the wireless communication (CP) subsystem.

In the present invention, the 3G wireless communication subsystem and the 2G wireless communication subsystem include one virtual identity identification card administration module (SIM Proxy, also called SIM card virtual proxy area) respectively. Wherein, the 2G wireless communication subsystem includes the first virtual identity identification card administration module and the 3G wireless communication subsystem includes the second virtual identity identification card administration module, to realize that the two wireless communication subsystems manage and use one SIM card together, thus it can make the use and management of the SIM card more flexible and efficient.

Specifically, the 2G wireless communication subsystem reads the information in the identity identification card in the identity identification module, stores the information in the identity identification card in an owned first virtual identity identification card administration module, and communicates with the 2G network by using the information of the identity identification card in the first virtual identity identification card administration module; and the 3G wireless communication subsystem reads the information of the identity identification card in the first virtual identity identification card administration module in the 2G wireless communication subsystem into an owned second virtual identity identification card administration module, and communicates with the 3G network by using the information of the identity identification card in the second virtual identity identification card administration module.

The two independent wireless communication subsystems can construct one SIM Proxy (virtual SIM card administration module) in the AT command interface layer (also called the AT command adaption layer) respectively, that is, one SIM card is accessed and managed through the virtual software manner and the dual network and dual standby function is realized based on usage of one SIM card.

In another embodiment, the wireless communication subsystem also can construct one SIM Proxy in the wireless protocol stack respectively, its realization way is similar, and will not be detailed again.

After the 2G wireless communication subsystem reads the information in the identity identification card in the identity identification module, it can store all or partial information in the identity identification card into the first virtual identity identification card administration module, for example, it can store one or more of three parameters, a public land mobile network (PLMN) identification, a Temporary Mobile Subscriber Identity (TMSI) and a Location Area Identification (LAI) in the identity identification card, in the first virtual identity identification card administration module. Then, the 3G wireless communication subsystem reads the information of the identity identification card in the first virtual identity identification card administration module again, and stores the information into the second virtual identity identification card administration module.

In addition, the International Mobile Subscriber Identification Number (IMSI) of the identity identification card may not be stored in the first and the second virtual identity identification card administration modules, while in the process of the 3G wireless communication subsystem communicating with the 3G network, if an IMSI of the identity identification card needs to be sent to the 3G network, then the 3G wireless communication subsystem asynchronously accessing the identity identification card in the identity identification module through the 2G wireless communication subsystem and obtaining the IMSI of the identity identification card.

In the embodiment of the present invention, the service distribution may be performed, that is: aiming at the characteristic that the bandwidth of the 3G network is larger and suitable for the data service, and the 2G network optimization work has more accumulation and supports the 2G service, such as, voice, etc., better, by using the 2G and 3G dual network and dual standby, it realizes the service distribution of the Packet Switching (PS) service and the Circuit Switching (CS) service (that is, the 2G network bears the CS service, and the 3G networks bears the PS data service), to evade the problem brought by the coexisting of the 2G and 3G network at present.

Specifically, when a user of the dual network and dual standby terminal initiates a service, the application subsystem selects a network according to a service type; when the initiated service is a PS service or a videophone service in a CS service, the application subsystem selects the 3G network; when the initiated service is a CS service except the videophone service, the application subsystem selects the 2G network; and when the selected network meets a condition of signal intensity, the wireless communication subsystem corresponding to the selected network performs the communication through the selected network.

Wherein, although the videophone service is the service based on the CS circuit domain, since it must be beard through the 3G network, when the user initiates the videophone service, the 3G network needs to be selected.

The above-mentioned meeting the condition of the signal intensity refers to that the signal intensity of the network can bear the relevant service (that is, the initiated service). In specific implementation, it may be judging that the condition of the signal intensity is met when the signal intensity of the network is greater than the appointed threshold.

In the present invention, it can adopt the following way to adjust the initiated PS service, including:

1. when the initiated service is a PS service and the application subsystem selects the 3G network, if judging that the PS is unable to be initiated according to a current signal intensity of the 3G network monitored by the 3G wireless communication subsystem, the application subsystem notifying the 2G wireless communication subsystem to activate a 2G data link of the 2G network and initiating the service;

2. when the initiated service is a PS service, in a process of the 3G wireless communication subsystem performing the communication through the 3G network, if the application subsystem judging that the current signal intensity of the 3G network is weakened to be unable to bear the PS service according to the current signal intensity of the 3G network monitored by the 3G wireless communication subsystem, then the application subsystem notifying the 3G wireless communication subsystem and the 2G wireless communication subsystem to switch a packet data protocol (PDP) data link corresponding to the PS service from a 3G data link to a 2G data link.

3. when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifying the 3G wireless communication subsystem and the 2G wireless communication subsystem to switch the PS PDP data link corresponding to the PS service from the 2G data link to the 3G data link.

In specific implementation, it can be that the application subsystem judges the current signal intensity of the 3G network, if no more than the appointed threshold value, then judging that it is unable to initiate the PS service or bear the PS service; if greater than the appointed threshold value, then judging that it can bear the PS service. Certainly, the appointed threshold value used by the above-mentioned three kinds of situations can be equal, and also can different.

In addition, for the situation that the initiated service is a videophone service, but the application subsystem judges that it is unable to initiate the videophone service according to the current signal intensity of the 3G network monitored by the 3G wireless communication subsystem, the application subsystem controls the videophone service to fall back to the ordinary voice service, and then notifies the 2G wireless communication subsystem to initiate the voice service.

The above-mentioned 3G network can be a Time Division-Synchronous Code Division Multiple Access (TD-SCDMA) network, a Wideband Code Division Multiple Access (WCDMA) network and a CDMA2000 network, etc. and the 2G network can be a GSM network and a Code Division Multiple Access (CDMA) network, etc. In the embodiment and application example of the present invention, it is described mainly by regarding the 3G network as the TD-SCDMA network and the 2G network as the GSM network, but it is not limited herein, and other types of the 3G network and the 2G network are also suitable for the present invention too.

Further description is given below based on the application example in which the 3G network is the TD-SCDMA network and the 2G network is the GSM network.

Figure 2:
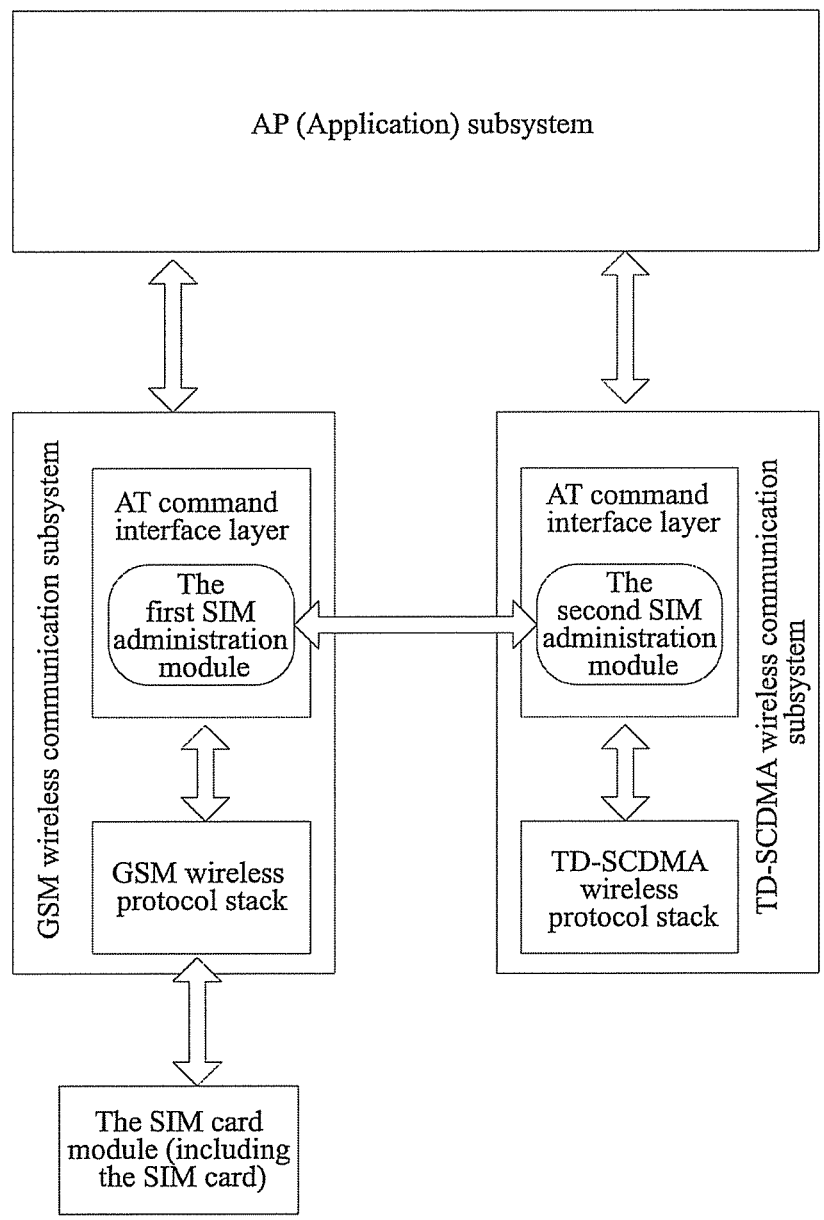
FIG. 2 is a schematic diagram of an apparatus for performing communication by a dual network and dual standby terminal according to an application example of the present invention.
Figure 3:
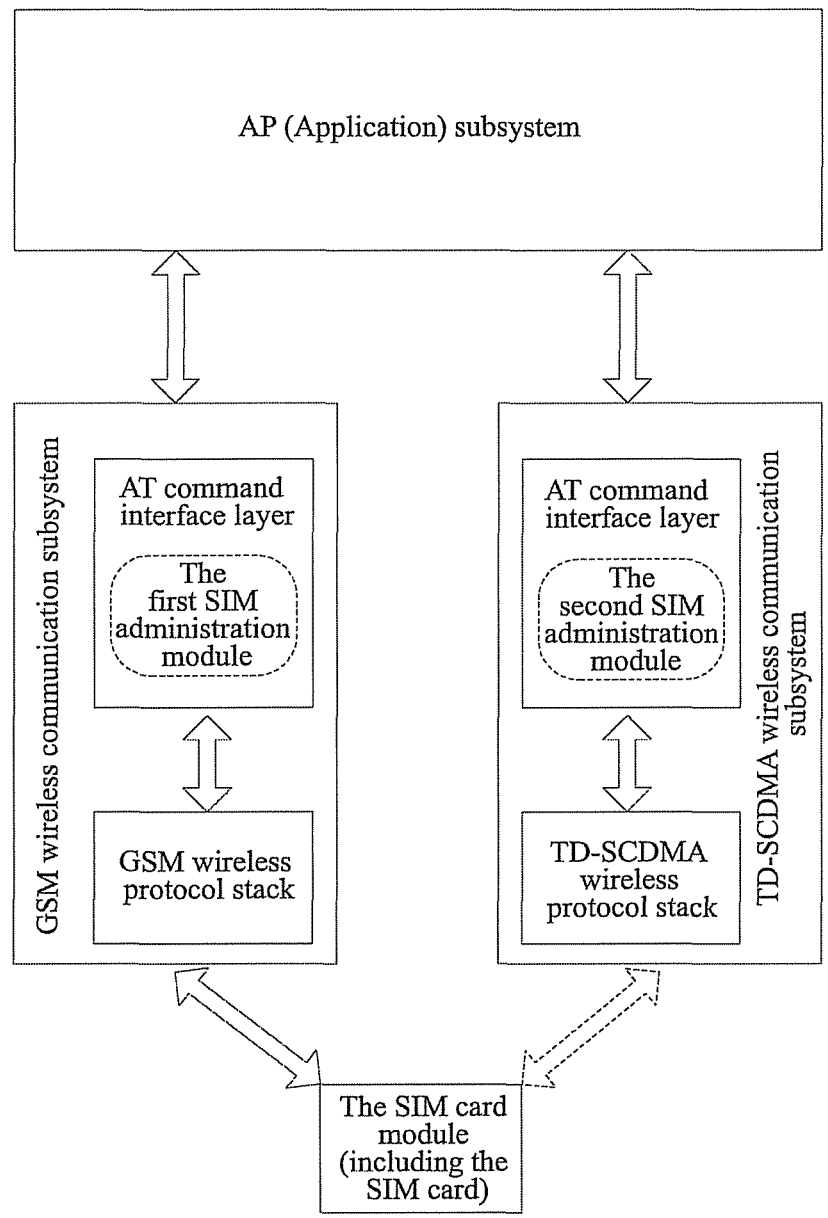
FIG. 3 is an effect diagram of an apparatus for performing communication by a dual network and dual standby terminal according to an application example of the present invention.

As shown in FIG. 2, the present example uses the TD-SCDMA/GSM dual network and dual standby mobile phone of the three-core framework of "AP (application)+TD Modem (wireless)+GSM Modem (wireless)" to realize the 2G and 3G network bearing distribution of the CS and PS services, wherein, the AP part is the main module responsible for the application, and the two wireless communication subsystems, the TD-SCDMA modem and the GSM modem, are responsible for the interaction with the 2G and the 3G network respectively. In order to realize the function that two wireless modules share one SIM card, since the frequency of the user using the CS service is much higher than the frequency of using the PS service, the SIM card slot (the identity identification module) is equipped as connected with the GSM Modem. One SIM Proxy is constructed in the AT command interface layers of the TD-SCDMA modem and the GSM modem respectively, and the GSM modem can access the SIM card directly at the time of initialization, the data of the SIM card is read out in the AT command format and the data of the SIM card is stored in the Element file format into the SIM Proxy, while the TD-SCDMA Modem obtains most effective information of the SIM card through the SIM Proxy and also can access the SIM card through the SIM Proxy after the starting and initialization, which realizes the function that two independent wireless communication subsystems access the same SIM card in theory and achieves the objective of the dual network and dual standby with single card and single number.

As shown in FIG. 2, the apparatus for realizing the CS and PS service distribution of the 2G-3G dual network and dual standby based on the dual network and dual standby with single card and single number of the application example includes the following modules:

A. AP (Application) Subsystem the AP subsystem has an application processor module with an independent CPU, is a master control system of the cell phone terminal, and is responsible for interacting with the user; if the user needs to perform the operation of the wireless communication aspect or the SIM card aspect, then the system is responsible for controlling the corresponding wireless communication system to finish the related function. The present subsystem has the following functions in the present example:

1. according to the principle that "the CS service runs in the 2G network and the PS service runs in the 3G network", all services are classified; when the user initiates the service, if judging that it is the CS service, then it is initiated from the GSM wireless communication subsystem; if it is the PS service, then it is initiated from the TD wireless communication subsystem. Wherein, since the CS64 kbps videophone is the peculiar service of the TD-SCDMA network, the visual telephone service is also initiated through the TD-SCDMA wireless communication subsystem.

2. the current PS service policy of the terminal is adjusted according to the signal intensity of the TD-SCDMA network where the TD-SCDMA wireless communication subsystem locates, wherein, the TD-SCDMA wireless communication subsystem is responsible for monitoring the signal intensity of the TD-SCDMA network. For example:

when the signal intensity of the TD-SCDMA network where the TD-SCDMA wireless communication subsystem locates monitored by the TD-SCDMA wireless communication subsystem is not enough to support initiating the relevant data service, the application subsystem can activate the 2G data link to initiate the relevant service through the GSM wireless communication subsystem.

In the process that the terminal is using the default TD-SCDMA network to perform the data service, the signal of the network where the terminal locates is weakened to be unable to support the relevant service for normal operation, the application subsystem is responsible for switching the data link of the relevant PDP to the 2G data link which is charged by the GSM wireless communication subsystem, to continue the normal operation of the relevant service.

B. The GSM Wireless Communication Subsystem the GSM wireless communication subsystem is responsible for interacting with the GSM network and bearing various CS services, and is responsible for performing the initialization work of the SIM, which can include the AT command interface layer and the GSM wireless protocol stack.

The GSM wireless communication subsystem includes a GSM Modem (in the present example, it can be thought that the GSM wireless communication subsystem is the GSM Modem), which is mainly responsible for bearing all CS circuit domain services except the videophone service in the whole terminal, and bearing the relevant data service temporarily through the 2G data link when the TD-SCDMA signal is not good.

One SIM Proxy (the first SIM Proxy) is constructed in the AT command interface layer of the GSM modem, in the starting process, it is responsible for reading out most parameters of the SIM card and storing the parameters into the SIM Proxy at the GSM Modem side, such as, the PLMN identification, TMSI, LAI, etc., preparing to be read by the SIM Proxy at the TD-SCDMA Modem side, and finishing the network registration of the TD Modem.

The GSM Modem connects to the TD-SCDMA Modem by using the hardware, for example, through the Universal Asynchronous Receiver/Transmitter (DART), the Universal Serial Bus (USB), and the I2C bus, etc., which is convenient for TD-SCDMA Modem to read the parameter of the SIM card from the SIM Proxy of the GSM Modem when the initialization is performed.

C. The TD-SCDMA Wireless Communication Subsystem the TD-SCDMA wireless communication subsystem is responsible for interacting with the TD-SCDMA network, bearing various PS services and the videophone function, and may include the AT command interface layer and the TD-SCDMA wireless protocol stack.

The TD-SCDMA wireless communication subsystem includes the TD-SCDMA Modem (in the present example, it can be thought that the TD-SCDMA wireless communication subsystem is the TD-SCDMA Modem). The TD-SCDMA Modem of the present example is different from the commercial TD-SCDMA Modem at present, and it does not have the TD-SCDMA/GSM dual mode switching function and only works in the "TD-SCDMA ONLY" mode. It is mainly responsible for interacting the data of the data service and the videophone service based on the TD-SCDMA network, and monitoring the signal intensity of the TD-SCDMA network where the current terminal locates; when the signal is weakened to a certain value, then it notifies the AP subsystem to switch the PS service to the GSM wireless communication subsystem.

The TD-SCDMA wireless communication subsystem side also constructs one SIM Proxy (the second SIM Proxy) in the AT command interface layer. When the TD-SCDMA modem is initialized, most parameters of the SIM card in the SIM proxy of the GSM Modem side are read and stored in the SIM Proxy area of the TD-SCDMA modem side through the hardware channel; when the protocol stack initializes the SIM card, it can obtain the relevant parameters of the SIM card from the SIM Proxy without needing access the SIM card directly, which may save the initialization time. But as the authorization algorithms (the network side needs the IMSI information of the SIM card) is involved, it still needs the TD-SCDMA modem to asynchronously access the SIM card through the hardware channel in AT command format, which usually needs to ensure that it is finished within 200 ms, so the channel driver of the hardware needs to ensure the speed requirement. In the view of effect, this procedure equals that two Modems access the same SIM card at the same time, which realizes the function of the dual network and dual standby with single card and single number.

D. The SIM Card Module (The Identity Identification Module)

one SIM card (the identity identification card) is inserted in the SIM card module, and the SIM card stores the information used for the GSM network and the TD-SCDMA network to perform the identity authorization.

In the starting and initialization process, since the SIM card is actually hung up to the GSM Modem, the TD-SCDMA modem access the SIM card through the virtual way, in the starting process, the GSM Modem should be powered up at first, and the GSM Modem finishes the initialization of the SIM card firstly and is responsible for reading out most parameters of the SIM card and stores in the first SIM Proxy of the GSM Modem side, such as, the PLMN identification, TMSI, and LAI, etc. and then the TD-SCDMA Modem is powered up, the TD-SCDMA Modem reads most parameters of the SIM in the local second SIM Proxy from the SIM Proxy of the GSM Modem firstly, and then initiates the initialization procedure of the protocol stack; the protocol stack reads the most parameters of the SIM card from the second SIM Proxy; the authorizing algorithm is involved, so it still needs the TD-SCDMA modem to asynchronously access the SIM card through the hardware channel, and the IMSI number of the same SIM card will be reported to the respectively corresponding TD-SCDMA network and GSM network finally.

Taking the ordinary voice telephone service as an example, when the user calls out the voice telephone through the dialing interface, the application subsystem, according to the logic of "the CS service runs in the GSM network and the PS service runs in the TD-SCDMA network", calls the GSM wireless communication subsystem to interact with the GSM network and performs the service with each other through the GSM network bearing. When being called, the network equipment, according to the information registered in the network side by the terminal (mainly IMSI number used by the terminal registering the GSM network), establishes the link with the GSM wireless communication subsystem of the terminal and bears the service. Other CS service procedures, such as the short message, etc., are same.

It needs to be illustrated that, since the videophone service of the CS circuit domain on the basis of the TD-SCDMA needs the TD-SCDMA network to perform the bearing, after the user initiates the call, the application subsystem will call the TD-SCDMA wireless communication subsystem to interact with the TD-SCDMA network and bear the data. And when being called, the network equipment, according to the information registered in the network side by the terminal (mainly IMSI number used by the terminal registering the GSM network), establishes the link with the TD-SCDMA wireless communication subsystem of the terminal and bears the service.

When the user surfs the Internet through the browser, after the user inputs the relevant website in the browser, the application subsystem inquires the signal intensity of the TD-SCDMA network where the terminal locates at present through the TD-SCDMA wireless communication subsystem firstly. When the application subsystem acquires that the network signal meets the requirement, and then it establishes the data link channel based on the TD-SCDMA network and perform the interaction of the relevant service through the TD-SCDMA wireless communication subsystem and the network service equipment corresponding to it. When the application subsystem acquires that the network signal does not meet the requirement, the application subsystem will initiatively establish the data link channel based on the GSM network to substitute the TD-SCDMA network to finish the networking service through the GSM wireless communication subsystem and the network service equipment corresponding to it. Certainly, when the terminal surfs the Internet by using the default TD-SCDMA wireless communication subsystem and the TD-SCDMA network, and when the network signal is weakened to be not enough to meet the service requirement, the terminal application subsystem will disconnect the PDP data link based on the TD-SCDMA network initiatively through initiatively TD-SCDMA wireless communication subsystem, and immediately calls initiatively GSM wireless communication subsystem to make the terminal and GSM network establish the data link, to maintain continuing the networking service. On the contrary, when the terminal surfs the Internet by using the GSM wireless communication subsystem and GSM network temporarily, and when the terminal application subsystem acquires that the TD-SCDMA network signal recovers and meets the data service requirement through TD-SCDMA wireless communication subsystem, it will switch the relevant PDP data link back to the data link of the TD-SCDMA.

Other format of data service is basically similar with the procedure of surfing the Internet through the browser, and it will not go into details here. However, for the multimedia message and the mail service of the PushMail service, since the special PUSH notification message mechanism in its service procedure, the interaction procedure when passively receiving the relevant multimedia message and PushMail mail is a little more complex. Since the PUSH notification message belongs to the CS domain category, the network side will send the relevant PUSH notification message to the terminal application subsystem through the GSM network and the GSM communication subsystem firstly, and then the terminal application subsystem schedules according to the relevant PS service policy based on the current network situation.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limited to any specific form of the combination of the hardware and software.

The above description is only the preferred embodiments of the present invention and is not intended to limit the present invention. For those skilled in the art, the present invention can have various modifications and variations. All of modifications, equivalents and/or variations without departing from the spirit and essence of the present invention should be fallen into the protection scope of the present invention.

INDUSTRIAL APPLICABILITY

The method and apparatus of the present invention realizes the dual network and dual standby function only by using a single SIM card, and, compared with other terminal which is dual network and dual standby with dual card and dual number, is conducive to the design of the hardware and the structure and saves the cost. Compared with the current 2G/3G dual mode and single standby terminal technology, the present invention, when giving consideration to the CS domain service specialty of the 2G network and the data service specialty of the 3G network, reduces the probability of the dual mode switching (only part of switching in the data service), which fundamentally reduces and avoids the failures, such as, frequent reselection of the network, serious power consumption, the call dropping, and the network disconnecting, etc., of the 2G/3G dual mode and single standby terminal because of the "2G and 3G dual mode switching" policy as well. It improves the use experiences of the terminal user, and also promotes the development of the TD-SCDMA network.

What is claimed is:

1. A method for performing communication by a dual network terminal, the dual network terminal being a dual network and dual standby terminal, and the dual network and dual standby terminal comprising an application subsystem, a third generation mobile communication (3G) wireless communication subsystem, a second generation mobile communication (2G) wireless communication subsystem and an identity identification module, an identity identification card being inserted in the identity identification module, the identity identification card storing information for a 2G network and a 3G network to perform identity authorization, the 3G wireless communication subsystem and the 2G wireless communication subsystem comprising a virtual identity identification card administration module respectively, the 2G wireless communication subsystem being connected with the application subsystem, the identity identification module and the 3G wireless communication subsystem respectively, and the 3G wireless communication subsystem being connected with the application subsystem and the 2G wireless communication subsystem, and the method comprising:
the 2G wireless communication subsystem reading the information in the identity identification card in the identity identification module, storing the information in the identity identification card in a first virtual identity identification card administration module of the 2G wireless communication subsystem, and communicating with the 2G network by using the information of the identity identification card in the first virtual identity identification card administration module; and
the 3G wireless communication subsystem reading the information of the identity identification card in the first virtual identity identification card administration module into a second virtual identity identification card administration module, wherein the first virtual identity identification card administration module is located in the 2G wireless communication subsystem, and the second virtual identity identification card administration module is located in the 3G wireless communication subsystem, and communicating with the 3G network by using the information of the identity identification card in the second virtual identity identification card administration module.

2. The method according to claim 1, further comprising:
when a user of the dual network and dual standby terminal initiates a service, the application subsystem selecting a network according to a service type; when the initiated service is a packet switching (PS) service or a videophone service in a circuit switching (CS) service, the application subsystem selecting the 3G network; when the initiated service is a CS service except the videophone service, the application subsystem selecting the 2G network; and
when the selected network meets a condition of signal intensity, the wireless communication subsystem corresponding to the selected network performing communication through the selected 2G network or 3G network.

3. The method according to claim 2, further comprising:
when the initiated service is a PS service and the application subsystem selects the 3G network, if judging that the PS service is unable to be initiated according to a current signal intensity of the 3G network monitored by the 3G wireless communication subsystem, the application subsystem notifying the 2G wireless communication subsystem to activate a 2G data link of the 2G network and initiating the service; and when the initiated service is a PS service, in a process of the 3G wireless communication subsystem performing communication through the 3G network, if the application subsystem judges that the current signal intensity of the 3G network is weakened to be unable to bear the PS service according to the current signal intensity of the 3G network monitored by the 3G wireless communication subsystem, then the application subsystem notifying the 3G wireless communication subsystem and the 2G wireless communication subsystem to switch a packet data protocol (PDP) data link corresponding to the PS service from a 3G data link to the 2G data link.

4. The method according to claim 3, further comprising:
when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifying the 3G wireless communication subsystem and the 2G wireless communication subsystem to switch the PDP data link corresponding to the PS service from the 2G data link to the 3G data link.

5. The method according to claim 1, wherein,
the first virtual identity identification card administration module lies in an AT command interface layer of the 2G wireless communication subsystem, and the second virtual identity identification card administration module lies in an AT command interface layer of the 3G wireless communication subsystem.

6. The method according to claim 1, wherein,
in the step of the 2G wireless communication subsystem reading information in the identity identification card in the identity identification module and storing the information in the identity identification card into a first virtual identity identification card administration module of the 2G wireless communication subsystem, the 2G wireless communication subsystem stores one or more of three parameters, a public land mobile network (PLMN) identification, a Temporary Mobile Subscriber Identity (TMSI) and a Location Area Identification (LAI) in the identity identification card, in the first virtual identity identification card administration module.

7. The method according to claim 1, further comprising:
in the process of the 3G wireless communication subsystem communicating with the 3G network, if an International Mobile Subscriber Identification Number (TMSI) of the identity identification card needs to be sent to the 3G network, then the 3G wireless communication subsystem asynchronously accessing the identity identification card in the identity identification module through the 2G wireless communication subsystem and obtaining the IMSI of the identity identification card.

8. The method according to claim 1, wherein,
the 3G network is a Time Division-Synchronous Code Division Multiple Access (TD-SCDMA) network, a Wideband Code Division Multiple Access (WCDMA) network or a CDMA2000 network, and the 2G network is a global system for mobile communications (GSM) network or a Code Division Multiple Access (CDMA) Network.

9. An apparatus for performing communication by a dual network terminal, the dual network terminal being a dual network and dual standby terminal, and the apparatus comprising a third generation mobile communication (3G) wireless communication subsystem, a second generation mobile communication (2G) wireless communication subsystem and an identity identification module, the 2G wireless communication subsystem being connected with the identity identification module and the 3G wireless communication subsystem respectively, and the 3G wireless communication subsystem being connected with the 2G wireless communication subsystem, and the 3G wireless communication subsystem and the 2G wireless communication subsystem comprising one virtual identity identification card administration module respectively, wherein, one identity identification card is inserted in the identity identification module, and the identity identification card is configured to store information for a 2G network and a 3G network to perform identity authorization;

the 2G wireless communication subsystem is configured to read information in the identity identification card in the identity identification module, store the information in the identity identification card in a first virtual identity identification card administration module of the 2G wireless communication subsystem, and communicate with the 2G network by using the information of the identity identification card in the first virtual identity identification card administration module; and the 3G wireless communication subsystem is configured to read the information of the identity identification card in the first virtual identity identification card administration module into a second virtual identity identification card administration module, wherein the first virtual identity identification card administration module is located in the 2G wireless communication subsystem, and the second virtual identity identification card administration module is located in the 3G wireless communication subsystem, and communicates with the 3G network by using the information of the identity identification card in the second virtual identity identification card administration module.

10. The apparatus according to claim 9, further comprising an application subsystem, connected with the 3G wireless communication subsystem and the 2G wireless communication subsystem respectively;

the application subsystem is configured to: when a user of the dual network and dual standby terminal initiates a service, select network according to a service type; when the initiated service is a packet switching (PS) service or a videophone service in a circuit switching (CS) service, select the 3G network and notify the 3G wireless communication subsystem; when the initiated service is a CS service except the videophone service, select the 2G network and notify the 2G wireless communication subsystem;

the 3G wireless communication subsystem is further configured to: monitor a current signal intensity of the 3G network, and notify the current signal intensity of the 3G network to the application subsystem; and when the application subsystem selects the 3G network and the 3G network meets a condition of the signal intensity, communicate through the 3G network; and the 2G wireless communication subsystem is further configured to: when the application subsystem selects the 2G network and the 2G network meets the condition of the signal intensity, communicate through the 2G network.

11. The apparatus according to claim 10, wherein, the application subsystem is further configured to: when the initiated service is a PS service and when judging that the PS service is unable to be initiated according to the current signal intensity of the 3G network monitored by the 3G wireless communication subsystem, notify the 2G wireless communication subsystem to activate a 2G data link of the 2G network and initiate the PS service; and when the initiated service is a PS service, in a process of performing the communication through the 3G network, if judging that the current signal intensity of the 3G network is weakened to be unable to bear the PS service according to the current signal intensity of the 3G network monitored by the 3G wireless communication subsystem, then notify the 3G wireless communication subsystem and the 2G wireless communication subsystem to switch a packet data protocol (PDP) data link corresponding to the PS service from a 3G data link to a 2G data link; and when the 2G wireless communication subsystem uses the 2G data link to perform the PS service, and when judging that the current signal intensity of the 3G network is enhanced to be able to bear the PS service according to the current signal intensity of the 3G network monitored by the 3G wireless communication subsystem, then notify the 3G wireless communication subsystem and the 2G wireless communication subsystem to switch the PDP data link corresponding to the PS service from the 2G data link to the 3G data link.

12. The apparatus according to claim 9, wherein, the first virtual identity identification card administration module lies in an AT command interface layer of the 2G wireless communication subsystem, and the second virtual identity identification card administration module lies in an AT command interface layer of the 3G wireless communication subsystem.

13. The apparatus according to claim 9, wherein, the 2G wireless communication subsystem is further configured to: when reading information in the identity identification card in the identity identification module and storing the information in the identity identification card into the first virtual identity identification card administration module, store one or more of three parameters, a public land mobile network (PLMN) identification, a Temporary Mobile Subscriber Identity (TMSI) and a Location Area Identification (LAI) in the identity identification card, into the first virtual identity identification card administration module.

14. The apparatus according to claim 9, wherein, the 3G wireless communication subsystem is further configured to: in the process of communicating with the 3G network, if an International Mobile Subscriber Identification Number (IMSI) of the identity identification card needs to be sent to the 3G network, then asynchronously access the identity identification card in the identity identification module through the 2G wireless communication subsystem and obtain the IMSI of the identity identification card.

15. The apparatus according to claim 9, wherein, the 3G network is a Time Division-Synchronous Code Division Multiple Access (TD-SCDMA) network, a Wideband Code Division Multiple Access (WCDMA) network or a CDMA2000, and the 2G network is a global system for mobile communications (GSM) network or a Code Division Multiple Access (CDMA) Network.

\* \* \* \* \*